UNITED STATES PATENT OFFICE.

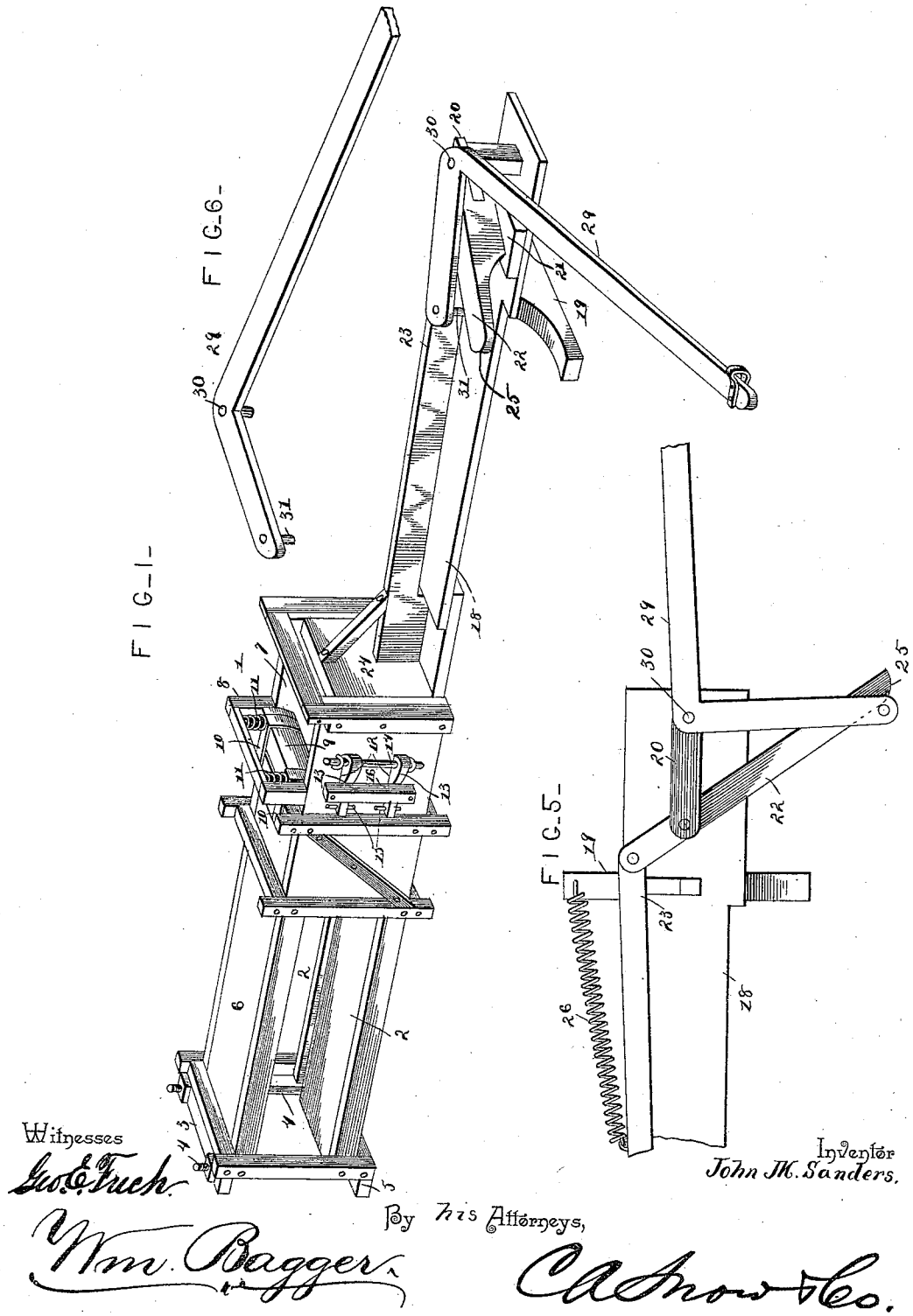

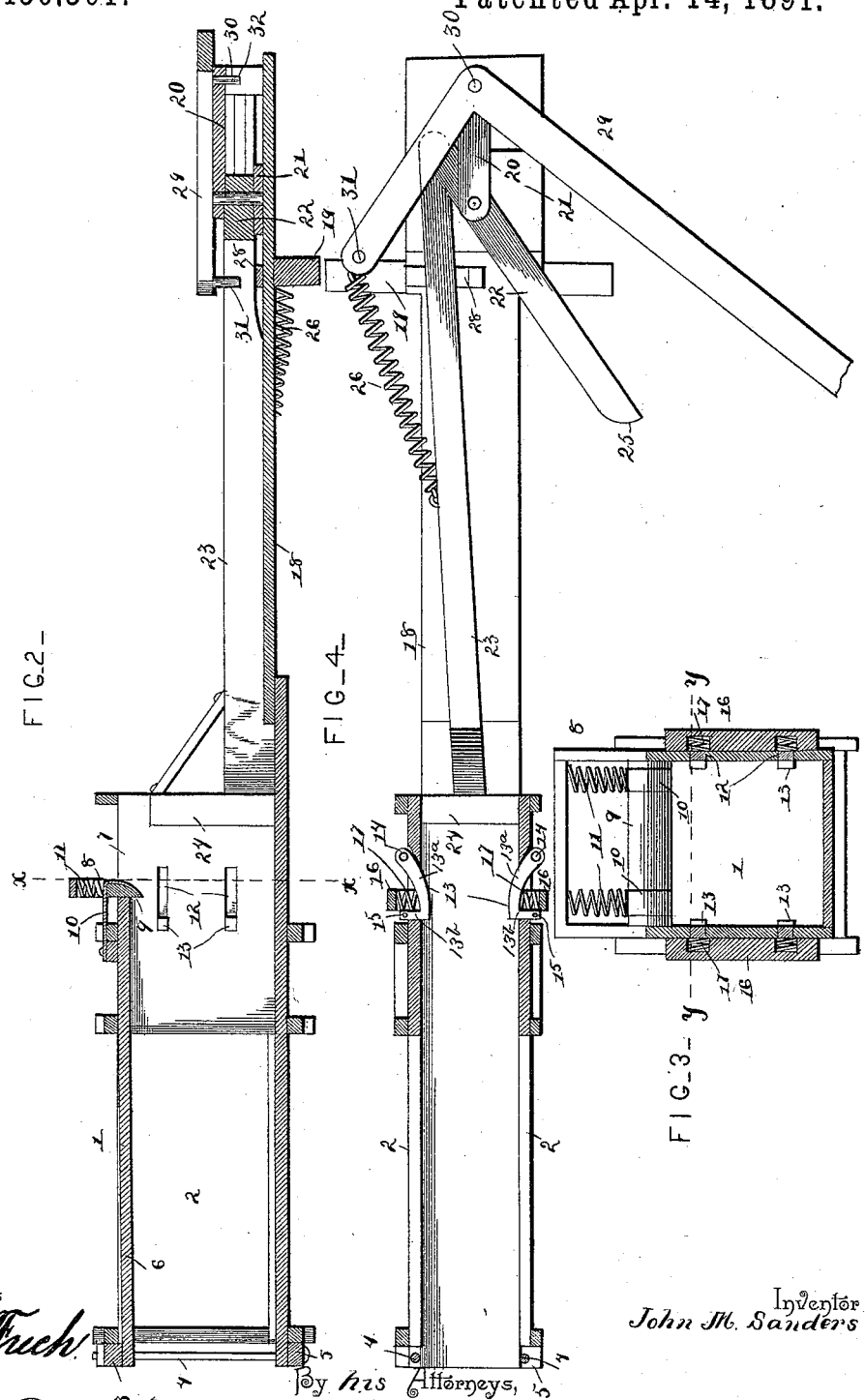

JOHN M. SANDERS, OF DALTON, GEORGIA.

BALING-PRESS.

SPECIFICATION forming part of Letters Patent No. 450,301, dated April 14, 1891.

Application filed August 26, 1890. Serial No. 363,125. (No model.)

*To all whom it may concern:*

Be it known that I, JOHN M. SANDERS, a citizen of the United States, residing at Dalton, in the county of Whitfield and State of Georgia, have invented a new and useful Baling-Press, of which the following is a specification.

This invention relates to baling-presses; and it has for its object to construct a press in which bales may be continuously formed and which shall be simple, durable, efficient, and easily operated.

The invention consists in the improved construction, arrangement, and combination of parts, which will be hereinafter fully described, and particularly pointed out in the claims.

In the drawings hereto annexed, Figure 1 is a perspective view of my improved baling-press. Fig. 2 is a longitudinal vertical sectional view of the same. Fig. 3 is a vertical transverse sectional view taken on the line $x$ $x$ of Fig. 2. Fig. 4 is a horizontal sectional view taken on the line $y$ $y$ of Fig. 3. Fig. 5 is a plan view of the operating mechanism. Fig. 6 is a perspective detail view of the operating-lever.

Like numerals of reference indicate like parts in all the figures.

1 designates the press-box, the sides of which are open, as shown at 2 2, for the purpose of affording convenient access to the bales for the purpose of tying the latter as they are being formed. The top of the baling-chamber is provided at its rear end with a cross-piece 3, through which extend bolts 4 4, that pass vertically through a cross-piece 5, arranged under the bottom of the baling-chamber at the rear end of the latter. It will be seen that by tightening the nuts upon the bolts 4 4 the top 6 of the baling-chamber may be caused to bear with any desired degree of pressure against the bales as the latter are forced outwardly through the press-box, thus presenting any desired degree of resistance to the plunger and causing the material to be packed more or less compactly.

The front end of the baling-chamber has in its upper side the feed-opening 7, at the rear edge of which is arranged a vertical frame 8, between the sides of which is mounted a vertically-sliding block 9, the front side of which is beveled. The said block is mounted upon flat springs 10, secured upon the top of the baling-chamber, and springs 11 are interposed between the said vertically-sliding block and the top of the frame 8. Said block forms a detent, the function of which is to prevent the material forced into the baling-chamber from escaping in a forward direction into the feed-chamber.

The sides of the baling-chamber are provided near their front ends with horizontal slots 12, in which are mounted the hook-shaped detents 13, each consisting of a curved body $13^a$ and a laterally-extending arm $13^b$. Said detents are pivoted upon vertical bolts 14, mounted at the front ends of the slots 12, and the straight lateral arms are provided at their outer ends with vertical pins 15 to keep them from passing entirely through the slots 12. Blocks 16 are secured vertically to the sides of the baling-chamber over the slots 12, and springs 17 are interposed between said blocks and the hooks 13 to force the latter in an inward direction. These springs are seated in the recesses between the curved bodies $13^a$ and the arms $13^b$, and are thus prevented from being easily displaced. The function of these hooks or detents, which is to prevent any forward movement of the contents of the press-box, will be readily understood.

18 designates a sill, one end of which is secured upon the front end of the bottom of the baling-chamber and the other end of which is mounted upon a suitable support 19. The front end of the sill 18 has a bracket 20, between which and a bearing-plate 21 upon the said sill is mounted a lever 22. The shorter end of the latter is connected pivotally with the stem 23 of the plunger 24, and the longer end of said lever 22 is beveled, as shown at 25. A retracting-spring 26 connects the stem of the plunger with the support 19, and a bracket 28 is suitably mounted upon the sill 18 to limit the movement of the plunger-stem.

29 designates a bent or L-shaped lever, which is provided at its corner or angle with a fulcrum-pin 30 and having at the outer end of its short arm a downwardly-extending pin 31, which, when desired, may be provided with an anti-friction roller. A bearing 32 for the fulcrum-pin 30 is formed in the upper side of the bracket 20.

The operation of this invention may be readily understood from the foregoing description, taken in connection with the drawings hereto annexed. The draft is attached to the end of the long arm of the lever 29, which latter turns upon the fulcrum-pin 30. The downward-extending pin 31 at the outer end of the short arm of said lever engages the long arm of the lever 22, thereby manipulating the latter to force the plunger into the press-box. When the pin 31 passes the beveled end 25 of the lever 22, the spring 27 serves to retract the plunger.

Having thus described my invention, I claim—

1. In a baling-press of the class described, the baling-chamber having the horizontally-slotted sides, in combination with the detents mounted pivotally at the front ends of said slots, said detents comprising the curved bodies 13$^a$ and laterally-extending straight arms 13$^b$, the pins extending vertically through the latter, the blocks 16, and the springs 17, interposed between said blocks and the detents and seated in the recesses between the curved bodies and the straight lateral arms of the latter, substantially as and for the purpose set forth.

2. In a baling-press, the combination of the press-box, the plunger, a horizontal lever, one end of which is connected with the plunger-stem, an L-shaped or angular lever, the short arm of which is provided with a downwardly-extending pin to engage the operating-lever, and a retracting-spring, substantially as set forth.

3. The combination of the press-box, the sill having a bracket at its front end, a lever pivoted between said bracket and a bearing-plate upon said sill and having its long arm beveled and its short arm connected pivotally with the stem of the reciprocating plunger, the retracting-spring, and the L-shaped or angular sweep or lever having a fulcrum-pin journaled in the bracket upon the front end of the sill and having at the end of its short arm a downwardly-extending pin to engage the beveled end of the operating-lever, substantially as set forth.

In testimony that I claim the foregoing as my own I have hereto affixed my signature in presence of two witnesses.

JOHN M. SANDERS.

Witnesses:
W. E. OSLIN,
P. G. WALKER.